United States Patent [19]

Takenouchi et al.

[11] Patent Number: 4,560,866
[45] Date of Patent: Dec. 24, 1985

[54] IMAGE PICK-UP APPARATUS WITH FOLDING OPTICS

[75] Inventors: Mutsuo Takenouchi; Takashi Ozawa; Toshihisa Hamano; Mario Fuse; Takeshi Nakamura; Hisao Itoh, all of Ebina, Japan

[73] Assignee: Fuji Xerox Co., Ltd., Tokyo, Japan

[21] Appl. No.: 486,347

[22] Filed: Apr. 19, 1983

[30] Foreign Application Priority Data

Apr. 23, 1982 [JP] Japan .................... 57-68498

[51] Int. Cl.⁴ .............................. H01J 3/14
[52] U.S. Cl. .................... 250/216; 250/578; 358/293
[58] Field of Search ............ 250/216, 578, 239; 358/212, 213, 293, 294; 357/29, 30, 31; 350/299, 300, 301

[56] References Cited

U.S. PATENT DOCUMENTS

| | | | |
|---|---|---|---|
| 3,867,569 | 2/1975 | Watson | 358/213 |
| 4,199,789 | 4/1980 | Yvard | 358/213 |
| 4,271,435 | 6/1981 | Takenouchi et al. | 358/213 |
| 4,337,394 | 6/1982 | Fukushima | 250/578 |

Primary Examiner—David C. Nelms
Attorney, Agent, or Firm—Spensley Horn Jubas & Lubitz

[57] ABSTRACT

An improved image pick-up apparatus for use in a facsimile equipment, phototelegraphic apparatus or the like is disclosed which enables these equipment and apparatus to have a reduced height with the aid of light beam passage changing devices such as mirrors. In this apparatus light beam is first emitted to the surface of an original manuscript from a light source and then the light beam after being reflected on the surface of the manuscript advances to photoelectric converting elements of an elongated photo sensor by way of the light beam passage changing device which serves to direct the light beam reflected on the surface of the manuscript to the photoelectric converting elements in such a manner that the optical axis of an optical system such as a light beam condensing optical fiber for building an image on the latter is directed substantially in parallel with the surface of the original manuscript.

16 Claims, 6 Drawing Figures

IMAGE PICK-UP APPARATUS WITH FOLDING OPTICS

BACKGROUND OF THE INVENTION

The present invention relates to an image pick-up apparatus for a facsimile equipment, phototelegraphic apparatus or the like and more particularly to an improved image pick-up apparatus including a transversely extending photo sensor having a length corresponding to the width of an original and an optical system comprising an array of lenses.

To facilitate understanding of the present invention it will be helpful that a typical conventional image pick-up apparatus of the above-mentioned type will be briefly described with reference to FIG. 1 which illustrates the apparatus by way of a perspective view with both the side walls removed therefrom. As will be apparent from the drawing, the image pick-up apparatus includes light sources 31 and 32, a lens array 20 constituting an optical system for building an image and a photo sensor 10 in the form of an elongated sensor each of which is housed in the space as defined by upper and lower casings PA and PB. The photo sensor 10 is dimensioned to have a length corresponding to the width of an original manuscript OR placed on the upper casing PA and is constructed by a combination of a base board 11, a required number of divided electrodes 12 arranged on said base board 11, a layer of photoconductive film 13 made of such materials as amorphous silicon, Selenium-Tellurium (Se-Te) and organic semiconductor coated over said divided electrodes 12 and a layer of light transmissive common electrode 14 coated over the whole surface of said photoconductive film 13. Namely, the photo sensor 10 is constructed by a large number of photoelectric converting elements arranged across the full width of the original manuscript OR with an arrangement density normally in the range of 8 to 12 pieces/mm for a single picture element, each of said photoelectric converting elements comprising a single divided electrode 12, a part of the photoconductive film 13 and a part of the common electrode 14.

From the viewpoint of designing the image pick-up apparatus in possibly small dimensions the photo sensor 10 requires an optical system by means of which an image is built without any enlargement or reduction, i.e., an image on the original manuscript OR is built on the photo sensor 10 at a dimensional ratio of 1 : 1. To meet the requirement, the lens array 20 is provided above the photo sensor 10 as illustrated in FIG. 1. The lens array 20 is generally constituted by so-called beam condensing optical fibers. For instance, the lens array 20 is constructed in such a way that the beam condensing optical fibers 21 are arranged side by side with the same arrangement density as that of the photoelectric converting elements or with an arrangement density higher than the latter within a suitable holder in such a posture as illustrated in FIG. 1 in which its optical axis is directed substantially at a right angle relative to the original manuscript OR placed on the upper casing PA.

The light sources 31 and 32 are symmetrically disposed at both sides of the lens array 20 so as to emit light beams toward the original manuscript OR through slits 33 and 34 formed on the light sources. Further, a glass plate 90 is fitted into a recess on the casing PA while it extends in the transverse direction over a distance corresponding to the width of the original manuscript OR, so that light beam is emitted in the direction as identified with an arrow mark F1 from each of the light sources 31 and 32 toward the original manuscript OR movably placed on said glass plate 90.

After light beam coming from the light sources 31 and 32 is reflected at the original manuscript OR, it advances down toward the lens array 20 in the direction as identified with an arrow mark F2 and passes through the latter. Thereafter, it advances down further toward the photo sensor 10 in the direction as identified with an arrow mark F3. It should be noted that scanning of an image on the original manuscript OR is carried out by successively driving the photoelectric converting elements in the photo sensor 10.

Since the conventional image pick-up apparatus is constructed in the above-described manner, there is generally established the following dimensional relation as shown in equation (1) between a distance LA measured from the lower surface of the original manuscript OR down to the inlet surface of the lens array 20 and a length LB of the lens array 20 in consideration of the influence of many factors such as diameter of fluorescent lamp for the light sources 31 and 32, position of the slits 33 and 34, i.e., entrance angle of light beam to the original manuscript OR, optical properties of the lens array 20 and others.

$$LB = 2LA \tag{1}$$

Further, the substantially same dimensional relation is established between a distance LC measured from the outlet surface of the lens array 20 down to the inlet surface of the photo sensor 10 and the aforesaid length LB of the lens array 20. Accordingly, the total distance LT measured from the lower surface of the original manuscript OR down to the inlet surface of the photo sensor 10 can be represented by the following equation.

$$\begin{aligned} LT &= LA + LB + LC \\ &= LA + 2LA + LA \\ &= 4LA \end{aligned} \tag{2}$$

Assuming that LA is, for instance, 12 mm, it results that LT becomes 48 mm. In view of practicability about 50 mm will be required for the total distance LT.

This means that a distance between both the upper and lower casings PA and PB is enlarged, resulting that the whole structure of the image pick-up apparatus must be unfavorably designed in larger dimensions. For instance, in case of a facsmile equipment the above-described image pick-up apparatus is utilized in an original read-out section but it is difficult to design and construct the whole apparatus in smaller dimensions due to the fact that other auxiliary apparatuses such as original recording section or the like are additionally attached to the image pick-up apparatus. As is well known, recent accelerated spread of so-called office automation machines throughout a variety of industries causes necessity for mounting them in a narrow space at a high functional efficiency from the viewpoint of maneuverability and operative efficiency and therefore requests for designing them in compact dimensions have been raised from many users.

SUMMARY OF THE INVENTION

Hence, the present invention has been made with the foregoing problems in mind.

It is an object of the present invention to provide an improved image pick-up apparatus which has a substantially reduced height so that an office automation mechanism in which the apparatus is mounted can be designed and constructed in smaller dimsnsions.

To accomplish the above object there is proposed in accordance with the present invention an image pick-up apparatus which is constructed in such a manner that a light beam passage extending from the surface of an original manuscript down to an photo sensor is caused to bend with the aid of a suitable light beam passage changing means comprising a light beam reflecting means such as a mirror or the like or a light beam refracting means such as a prism or the like whereby an optical axis of an optical system for building an image extends substantially in parallel to the direction of movement of the original manuscript. Owing to the above-described arrangement of the image pick-up apparatus according to the present invention it is assured that it can be designed at a substantially reduced height and thereby an office automation machine in which an image pick-up apparatus is mounted can be constructed in compact dimensions.

Other objects, features and advantages of the present invention will be apparent from reading of the following description made in conjunction with the accompanying drawings.

BRIEF DESCRIPTION OF THE DRAWINGS

The accompanying drawings will be briefly described below.

DESCRIPTION OF THE PREFERRED EMBODIMENTS

Now the present invention will be described in a greater detail hereunder with reference to the accompanying drawings which illustrate preferred embodiment of the invention.

Figure 2:
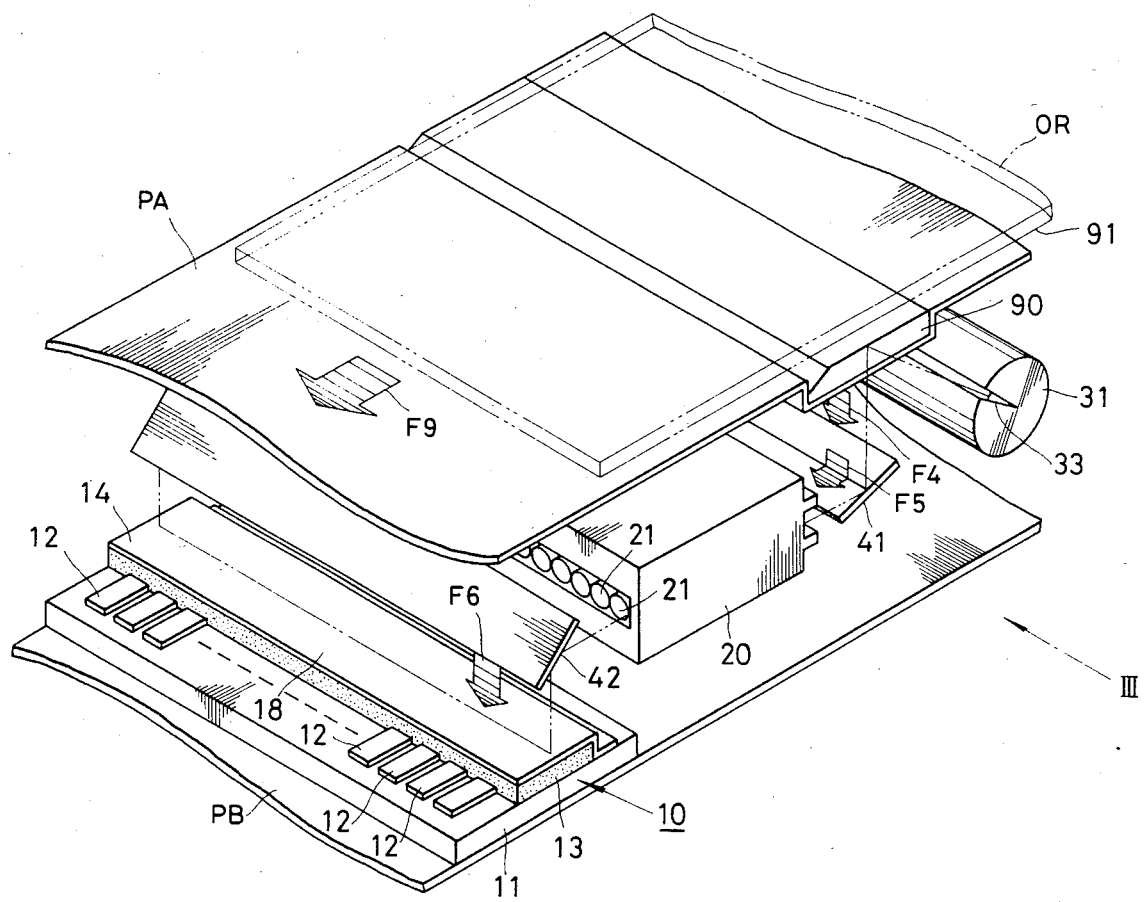
FIG. 2 is a perspective view of an image pickup apparatus in accordance with the first embodiment of the present invention.
Figure 3:
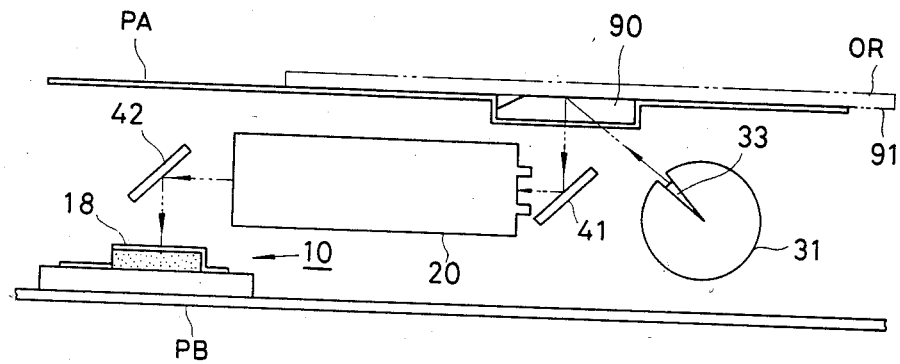
FIG. 3 is a side view of the image pick-up apparatus as seen in the direction as identified with an arrow mark III in FIG. 2.

First, an image pick-up apparatus in accordance with the first embodiment of the invention will be described with reference to FIGS. 2 and 3, wherein FIG. 2 is a perspective view of the apparatus and FIG. 3 is a side view as seen in the direction identified with an arrow mark III in FIG. 2. As will be apparent from the drawings, the apparatus is housed in the space as defined by an upper casing PA and a lower casing PB and includes a light source 31, an optical lens array 20 for building an image, an elongated sensor 10, a front mirror 41 and a rear mirror 42 both of which serve as an optical reflector. The casing PA is provided with a glass plate 90 as a light beam transmitting section through which light beam is transmitted to a surface 91 on an original manuscript OR (hereinafter referred to simply as an original surface 91) on which an image to be picked up is existent, said glass plate 90 extending in the transverse direction relative to the original manuscript OR by the full width of the latter, and the original manuscript OR is adapted to move over the glass plate 90 in the direction as identified with an arrow mark F9 in FIG. 2.

The light source 31 is constructed such that light beam is emitted through a transversely extending slit 33 with an upward inclination angle until it reaches the glass plate 90 and passes therethrough.

The lens array 20 is constructed such that a plurality of beam condensing optical fibers 21 having the same arrangement density as that of photoelectric converting elements constituting a photo sensor 10 to be described later or having an arrangement density more than the latter are accommodated in a suitable holder.

Specifically, the photo sensor 10 in the form of a transversely extending sensor is constructed by a combination of a required number of divided electrodes 12 arranged on a suitable base board 11 having a length corresponding to the width of the original manuscript OR, a layer of photoconductive film 13 made of such material as amorphous silicon, Selenium-Tellurium (Se-Te) and organic semiconductor, said photoconductive film 13 being laid over the divided electrodes 12, and a layer of light transmissive common electrode 14 coated over the whole surface of the photoconductive film 13. Namely, the photo sensor 10 is constructed by a large number of photoelectric converting elements laid across the full width of the original manuscript OR at an arrangement density normally in the range of 8 to 12 pieces/mm for a single picture element, each of said photoelectric converting elements comprising a single divided electrode 12, a part of the photoconductive film 13 and a part of the common electrode 14.

As described above, the mirrors 41 and 42 serve as reflecting means. Specifically, the mirror 41 is effective for reflecting the light beam reflected at the original surface 91 and then directing it therefrom toward the lens array 20, whereas the mirror 42 is effective for reflecting the light beam reflected at the lens array 20 and then directing it therefrom toward the light beam receiving surface 18 on the photo sensor 10.

The arrangement of the light source 31, the lens array 20, the photo sensor 10 and the mirrors 41 and 42 will be apparent from FIG. 3 which is a side view of the apparatus. The light source 31 is disposed so as to emit light beam toward the original surface 91 through the glass plate 90 at an upward inclination angle from the right side as seen in FIG. 3, whereas the lens array 20 is so disposed as to be substantially in parallel with the original surface 91. The mirror 41 is located at the position where light beam reflected at the original surface 91 enters the lens array 20 in the direction as identified with an arrow mark F5 in FIG. 2. Further, the photo sensor 10 is located at a predetermined position on the lower casing PB and the mirror 42 is located at the position where light beam coming from the lens array 20 enters the light beam receiving surface 18 of the photo sensor 10 in the direction as identified with an arrow mark F6 in FIG. 2. It should be noted that the above-described arrangement satisfies the relation of equation (2) [arrangements of other embodiments to be described later will also satisfy equation (2)].

Next, operation of the apparatus constructed in the above-described manner in accordance with the first embodiment of the invention will be described below.

Figure 1:
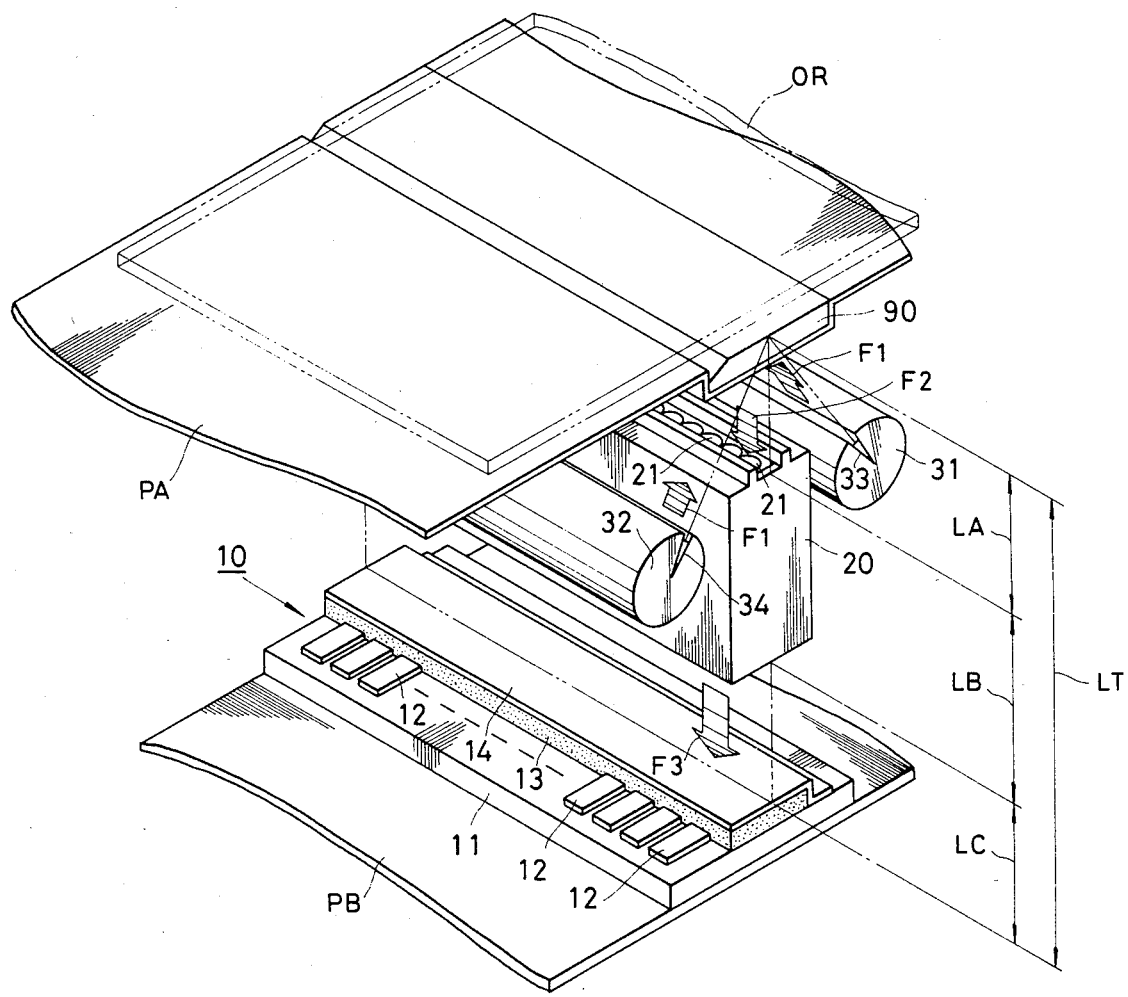
FIG. 1 is a perspective view of a conventional image pick-up apparatus.

Light beam reflected at the original surface 91 advances in the direction as identified with the arrow mark F4 in FIG. 2 until it reaches the mirror 41. It is then reflected therefrom in the direction as identified with the arrow mark F5 and enters the lens array 20. After passing through the lens array 20, it enters the mirror 42 to be reflected at the latter and then it advances in the direction as identified with the arrow mark F6 until it reaches the light beam receiving surface 18 of the photo sensor 20. Accordingly, in this embodiment it is assured that the distance between both the casings PA and PB is dimensioned less than that of the conventional image pick-up apparatus as illustrated in FIG. 1.

Next, an image pick-up apparatus in accordance with the second embodiment of the invention will be described below with reference to FIG. 4.

Figure 4:
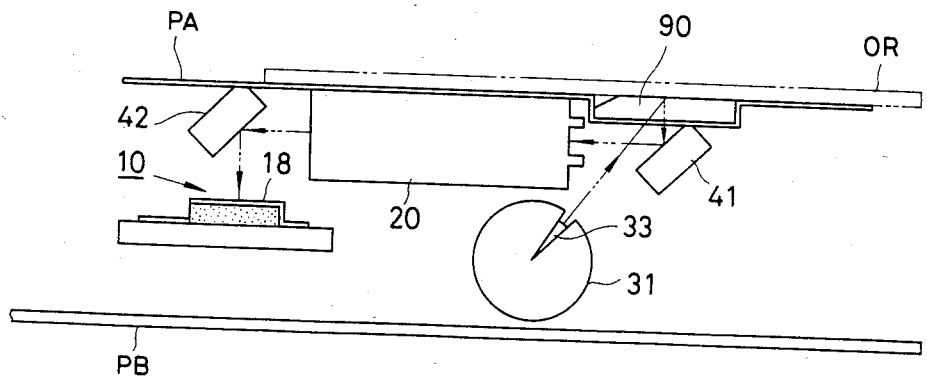
FIG. 4 is a side view of an image pick-up apparatus in accordance with the second embodiment of the present invention.
Figure 5:
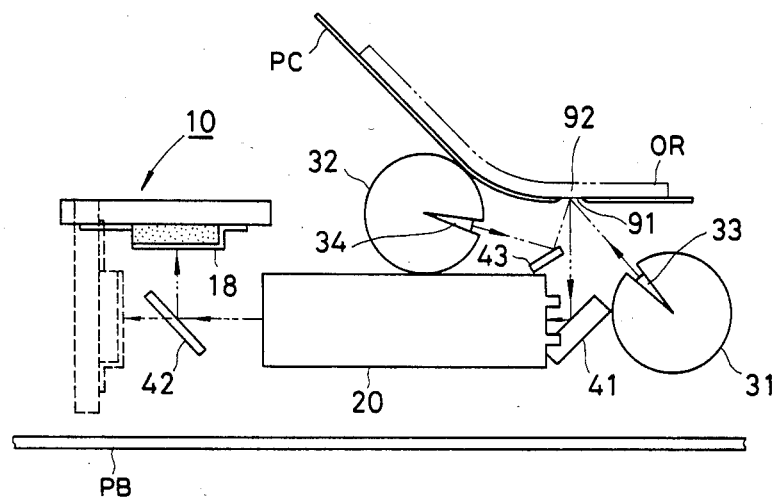
FIG. 5 is a side view of an image pick-up apparatus in accordance with the third embodiment of the present invention.

As will be apparent from FIG. 4, in the second embodiment the light source 31 is located in the opposite manner to the first embodiment (at the side of the lens array 20) and the mirror 41 is located at the right side. In this embodiment the lens array 20 can be disposed so as to be in parallel with the original surface 91. As a result, the distance between the casings PA and PB can be smaller. Further, as shown in FIG. 4 it becomes possible to construct the mirrors 41 and 42 and the lens array 20 integrally with the casing PA. Next, an image pick-up apparatus in accordance with the third embodiment of the invention will be described with reference to FIG. 5. In this embodiment an upper casing PC serving also as a feeding guide for the original manuscript has a curved configuration as illustrated in FIG. 5 so that the original surface 91 is exposed to light beam through a read-out slit 92. Two light sources 31 and 32 are disposed at both the sides relative to the read-out slit 92 so as to direct light beam in the inclined direction. Specifically, the light source 31 is arranged so that its light beam is emitted directly to the original surface through the read-out slit 92, whereas the light source 32 is arranged so that its light beam reaches the original surface 91 by way of a mirror 43 at which the light beam is reflected toward the read-out slit 92 as illustrated in the drawing. As will be apparent from FIG. 5, the lens array 20 can be arranged substantially in parallel with the casing PB also in this embodiment. After light beam has passed through the lens array 29, it is caused to reflect at the mirror 42 in the opposite direction to the first and second embodiments to reach the light beam receiving surface 18 of the photo sensor 10. In the first and second embodiments and in the fourth embodiment to be described later the passage of light beam extending from the original surface 91 to the photo sensor 10 is configured in the substantially Z-shaped form, whereas in the third embodiment the passage of light beam is configured in the substantially U-shaped form. Alternatively, the third embodiment may be modified in such a manner that after passing through the lens array 20 light beam is directed to the light beam receiving surface 18 as illustrated by dotted lines in FIG. 5 with the mirror 42 removed from the original position.

Figure 6:
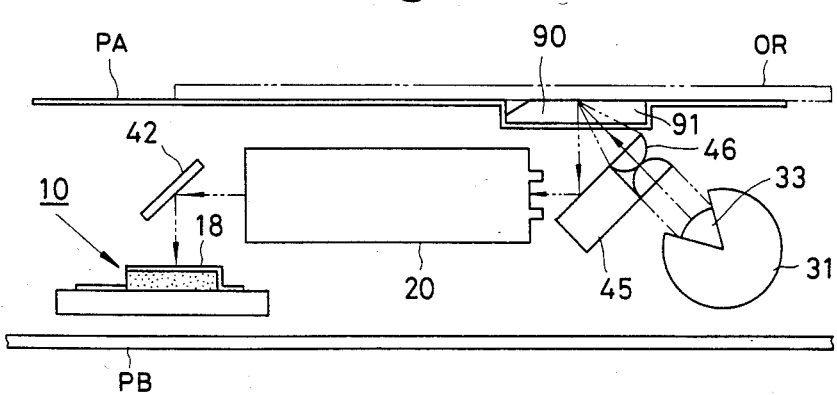
FIG. 6 is a side view of an image pick-up apparatus in accordance with the fourth embodiment of the present invention.

Next, an image pick-up apparatus in accordance with the fourth embodiment of the invention will be described with reference to FIG. 6.

In the fourth embodiment, a lens system 46 is disposed between the light source 31 and the original surface 91 so as to focus light beam at the original surface 91. The lens system 46 is integrally mounted on a mirror 45 which serves to allow reflected light beam from the original surface 91 to be directed toward the lens array 20. The arrangement of the apparatus made in the above-described manner assures that intensity of light beam to be emitted to the original surface 91 from the light source 31 is substantially increased, resulting in remarkably improved efficiency in photoelectric conversion in the photo sensor 10.

The results of experimental manufacturing of the image pick-up apparatus of the present invention reveal that it is possible to reduce the distance between the original surface 91 and the light beam receiving surface 18 of the photo sensor 10 to about 27 mm. It should be of course understood that the distance between both the casing PA and PB can be reduced in proportion to the foregoing distance.

Further, it should be noted that light source, lens array, photo sensor, mirrors and other parts and components in the above described embodiments are merely illustrative and they may be designed and constructed in a different way and therefore the present invention should be not limited only to these embodiments but it may be changed or modified in a suitable manner without any departure from the spirit and scope of the invention. In fact, the present invention consists in that a certain light beam passage changing means is provided for changing the light beam passage extending from the original surface to the light beam receiving surface on the photo sensor whereby the lens array can be arranged so that the optical axis of the lens array constituting an optical system for building an image thereon extends substantially in parallel to the direction of movement of an original. It should be of course understood that the aforesaid light beam passage changing means should be not limited only to light beam reflecting means such as mirror or the like but it may be constituted by other suitable optical means and moreover the number of light beam passage changing means should be not limited to a one.

What is claimed is:

1. An image pick-up apparatus of the type having:
    a transversely elongated photo sensor whose width corresponds to that of an original manuscript, said photo sensor including an array of photoelectric converting elements for performing photoelectric conversion in response to light signals incident thereto; and
    a light source for emitting light beam toward an original surface, the improvement comprising:
    first light beam direction changing means for directing a light beam reflected from the original surface to a direction substantially parallel with said original surface; and
    first optical means having an outer shape of a rectangular solid, the width thereof corresponding to that of the original manuscript, the height thereof being sufficiently shorter than depth thereof, said depth being the length of the rectangular solid with respect to the traveling direction of the light beam, said first optical means being so disposed that the face thereof having said width and depth is substantially in parallel with said original surface, said first optical means including a plurality of lens elements arranged in the direction of the width of the original surface, each of said lens elements individually leading the light beam passed through said first light beam direction changing means toward the corresponding photoelectric converting elements so that one line of picture elements is transmitted onto said elongated photo sensor without being enlarged or reduced.

2. An image pick-up apparatus as defined in claim 1 wherein said first light beam direction changing means is a mirror.

3. An image pick-up apparatus as defined in claim 1 wherein said first optical means is a light condensing optical fiber array.

4. An image pick-up apparatus as defined in claim 1 further comprising second light beam direction changing means for directing the light beam emergent from said first optical means to a direction substantially perpendicular to said original surface prior to entry of said light beam into said photoelectric converting elements of the elongated photo sensor.

5. An image pick-up apparatus as defined in claim 4 wherein said first and second light beam direction changing means are mirrors.

6. A image pick-up apparatus as defined in claim 1 further comprising a second optical means for condensing the light beam emitted from said light source so that said original surface is irradiated by the condensed light beam.

7. An image pick-up apparatus as defined in claim 6 wherein said second optical means and said first light beam direction changing means are integrally constructed.

8. An image pick-up apparatus as defined in claim 1 and including:
a substantially horizontal upper casing along which said original manuscript is moved relative to said apparatus,
said photo sensor, said first light source, said first light beam direction changing means and said first optical means all being positionally fixed with respect to said upper casing with said first light beam direction changing means directing said reflected light beam in a direction substantially parallel to said upper casing, and
a lower casing substantially parallel to said upper casing and spaced therefrom by a maximum distance which is substantially less than 2 LB, where LB is said depth of said rectangular solid first optical means.

9. An image pick-up apparatus as defined in claim 7 and including:
a substantially horizontal upper casing along which said original manuscript is moved relative to said apparatus,
said photo sensor, said first light source, said first light beam direction changing means and said first optical means all being positionally fixed with respect to said upper casing with said first light beam direction changing means directing said reflected light beam in a direction substantially parallel to said upper casing, and
a lower casing substantially parallel to said upper casing and spaced therefrom by a maximum distance which is substantially less than 2 LB, where LB is said depth of said rectangular solid first optical means.

10. An image pick-up apparatus comprising:
a transversely elongated photo sensor whose width corresponds to that of an original manuscript, said photo sensor including an array of photoelectric converting elements for performing photoelectric conversion in response to light signals incident thereto;
a light source for emitting light beam having a width corresponding to said manuscript width toward a surface of said original manuscript;
first light beam direction changing means for directing a light beam reflected from the original surface to a direction substantially parallel with said original surface, said light beam being indicative of picture information corresponding to one line of said original manuscript; and
first optical means disposed between said first light beam direction changing means and said transversely elongated photo sensor, for condensing said light beam indicative of said one line picture information reflected by said first direction changing means on said photoelectric converting element array without any magnification or reduction, said first optical means having an array of beam condensing lens elements which are equal to or exceed in number said photoelectric converting elements and are arranged in the longitudinal direction of said transversely elongated photo sensor such that an optical axis direction of each of said beam condensing lens elements coincides with a direction of said light beam refelcted from said original manuscript.

11. An image pick-up apparatus as defined in claim 10 wherein said first light beam direction changing means is a mirror.

12. An image pick-up apparatus as defined in claim 10 wherein said beam condensing lens element is a beam condensing optical fiber.

13. A image pick-up apparatus as defined in claim 10 wherein said first optical means further comprises second light beam direction changing means for directing the light beam passed through said array of beam condensing lens elements in a direction substantially perpendicular to the surface of said original manuscript so that the light beam enters said photoelectric converting element array of the elongated photo sensor.

14. A image pick-up apparatus as defined in claim 13 wherein said first and second light beam direction changing means are mirrors.

15. An image pick-up apparatus as defined in claim 10 further comprising a second optical means for condensing the light beam emitted from said light source in the longitudinal direction of said original manuscript so that said original surface is irradiated by the condensed light bean.

16. An image pick-up apparatus as defined in claim 15 wherein said second optical means and said first light beam direction changing means are integrally constructed.

* * * * *